US010096250B1

(12) United States Patent
McLean, III

(10) Patent No.: US 10,096,250 B1
(45) Date of Patent: Oct. 9, 2018

(54) AERIAL TRAFFIC PRESENTATION DEVICE AND METHODS

(71) Applicant: Rockwell Collins, Inc., Cedar Rapids, IA (US)

(72) Inventor: Angus Laughton Malcolm Thom McLean, III, Bradenton, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 16 days.

(21) Appl. No.: 15/057,960

(22) Filed: Mar. 1, 2016

(51) Int. Cl.
*G01C 21/00* (2006.01)
*G08G 5/00* (2006.01)
*B64C 39/02* (2006.01)
*B64D 43/00* (2006.01)

(52) U.S. Cl.
CPC ......... *G08G 5/0008* (2013.01); *B64C 39/024* (2013.01); *B64D 43/00* (2013.01); *B64C 2201/12* (2013.01)

(58) Field of Classification Search
CPC .... G08G 5/0008; B64D 43/00; B64C 39/024; B64C 2201/12
USPC ............ 340/971, 5.6, 5.64, 572.4, 439, 902, 340/870.09, 573.1; 342/128, 357.3, 387; 375/133
See application file for complete search history.

(56) References Cited

U.S. PATENT DOCUMENTS 9,274,521 B1 3/2016 Stefani et al.
2009/0248287 A1* 10/2009 Limbaugh ............ G08G 5/0013 701/120
2014/0257692 A1* 9/2014 Stefani .................. G01C 21/00 701/519

* cited by examiner

*Primary Examiner* — Dhaval Patel
(74) *Attorney, Agent, or Firm* — Daniel M. Barbieri; Donna P. Suchy; Angel N. Gerdzhikov

(57) ABSTRACT

A device and methods for generating and presenting aerial traffic information of at least one aerial vehicle (AV) are disclosed. The method for generating and presenting aerial traffic information may include a display system and an image generator (IG). The IG may be configured to generate image data based upon navigation data received from a plurality of AVs and message data received from the TIS provider, and provide this image data to the display system for the presentation of the aerial traffic information to one or more operators of the AV. The device and method for generating aerial traffic information may include a message generator (MG) configured to acquire navigation data from the plurality of AVs not configured with Automatic Dependent Surveillance—Broadcast (ADS-B) components and report their aerial positions in compliance with ADS-B formatted messages, allowing them to participate in an ADS-B system without ADS-B system components.

20 Claims, 3 Drawing Sheets

AERIAL TRAFFIC PRESENTATION DEVICE AND METHODS

BACKGROUND

Avionics engineers and aviation governing authorities are improving situational awareness of pilots and flight crews by providing them with information necessary to identify aircraft in flight, i.e., in-flight traffic. The United States Federal Aviation Administration (FAA) has developed surveillance and broadcast services designed to provide in-flight traffic information. These traffic information services include automatic dependent surveillance—broadcast (ADS-B) system and traffic information services—broadcast (TIS-B) system.

The ADS-B system is capable of broadcasting aerial traffic information such as position, velocity, and status information from an aircraft at regular intervals using position information obtained from onboard navigation systems. The TIS-B system includes a ground station which also provides aerial traffic information such as position, velocity, and status information of air and ground vehicles using information obtained from ADS-B, primary surveillance radar (which requires no reply from an aircraft), secondary surveillance radar (which requires aircraft to reply to interrogations), and other systems. The ADS-B system is commonly seen as a primary datalink, and the TIS-B is seen as a secondary datalink. Each of the systems provides a datalink to one or more other aircraft. A further source of traffic information may be provided from air traffic control (ATC) via looking out the window or through a ground based or other radar systems, e.g., the secondary surveillance radar. This information can then be communicated by the ATC to any aircraft within the vicinity of the airport.

Besides these systems of reporting in-flight traffic information, the market of Unmanned Aerial Vehicles (singularly, UAV) is developing exponentially at the time of this writing. As it develops, UAVs may be subjected to regulatory constraints in the areas in which they operate.

Generally, most UAVs are small when compared to most manned aerial vehicles. Because of their relatively small size, it may be too burdensome or prohibitive for operators to outfit or configure their aircraft with ADS-B components required of aircraft participating in the ADS-B system. The costs, weight, and size of these components may hinder and/or preclude UAVs from being flown.

SUMMARY

Embodiments of the inventive concepts disclosed herein are directed to a device and methods for generating and presenting aerial traffic information of at least one aerial vehicle (AV) not configured with ADS-B system component(s). The aerial traffic information may assist the TIS provider in identifying one or more AVs such as, but not limited to, UAVs that are not equipped with component(s) of an ADS-B system.

In one aspect, embodiments of the inventive concepts disclosed herein are directed to a device for generating message data reporting the positions of a plurality of AVs. The device may include a message generator (MG) and may be configured to perform the method as disclosed in the following paragraph.

In a further aspect, embodiments of the inventive concepts disclosed herein are directed to a method for generating message data reporting the positions of a plurality of AVs. When properly configured, the MG may acquire navigation data from the plurality of AVs and generate message data in response. The navigation data may be minimal and include data representative an identity of the AV and its geographic position that has been generated in a format that differs from those formats specified in the ADS-B system and the TIS-B system. For at least one of the AVs, the message data could be representative of its location, speed, direction of travel, and altitude at least one AV, and generated in a format that complies with the format specified in the ADS-B system or the TIS-B system.

In a further aspect, embodiments of the inventive concepts disclosed herein are directed to a method for presenting aerial traffic information. The system may include a display system and an image generator (IG). The display system could be configured to receive image data from the IG configured (or programmed) to generate image data based upon navigation data received from a plurality of AVs and message data received from the TIS provider, and provide this image data to the display system for the presentation of the aerial traffic information to one or more operators of the AVs.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
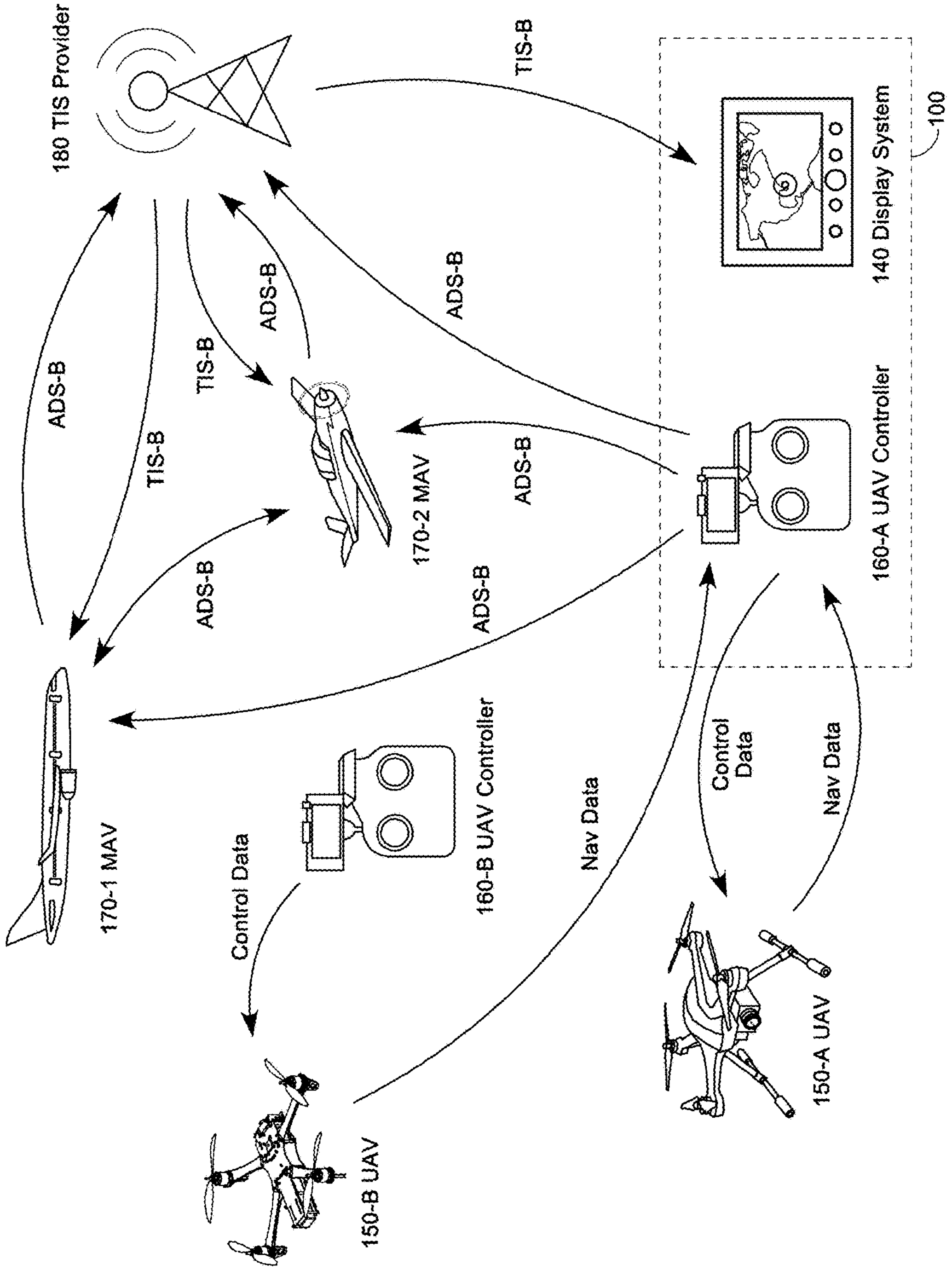
FIG. 1A depicts participants of an aerial traffic information generating and presenting system according to the inventive concepts disclosed herein.
Figure 1B:
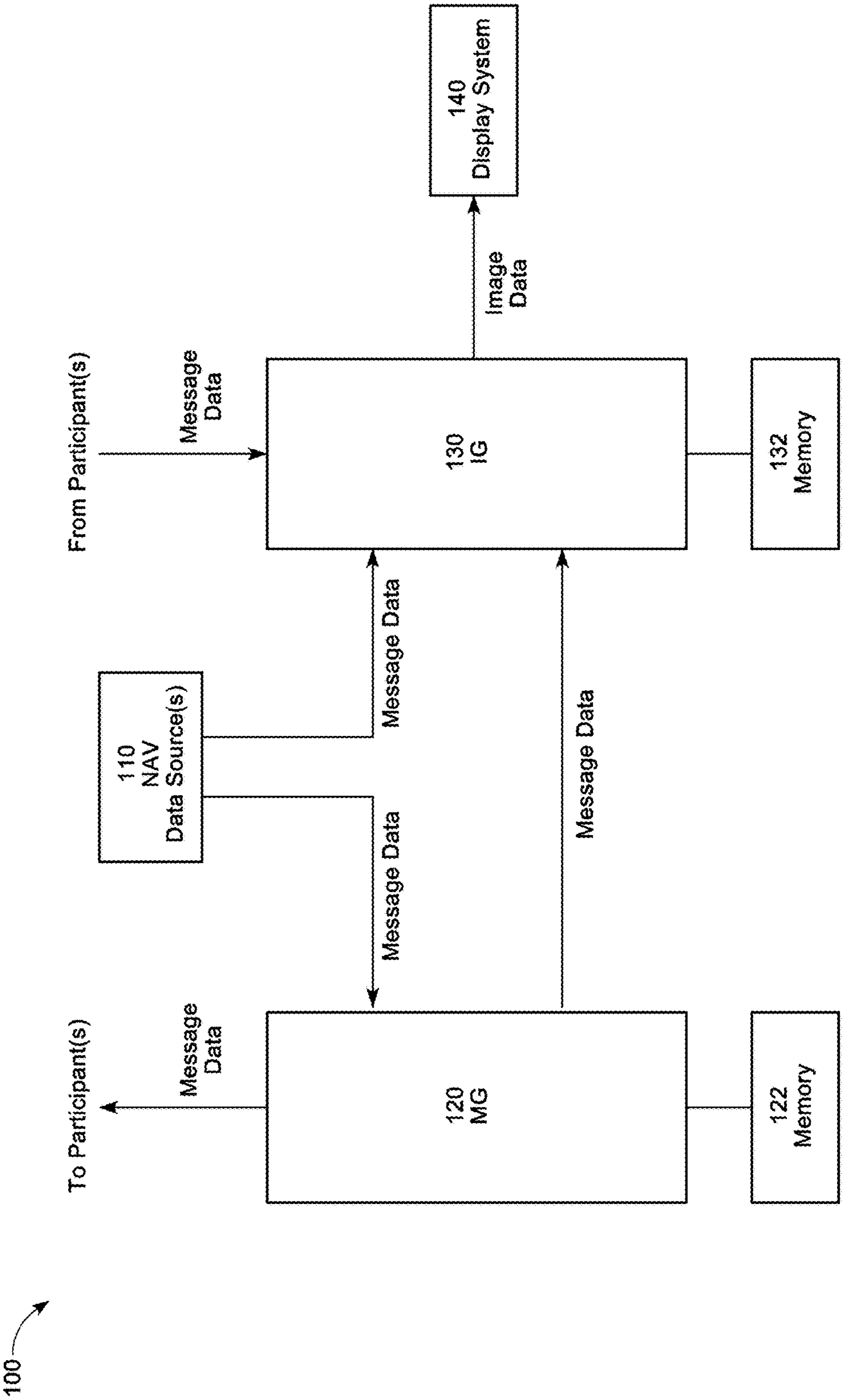
FIG. 1B depicts a functional block diagram of the system of FIG. 1A as it corresponds to AVs.

Referring now to FIGS. 1A-1B, an embodiment of an aerial traffic reporting system 100 suitable for implementation of the techniques described herein. The system 100 may include at least one navigation data source 110, a message generator (MG) 120, an image generator (IG) 130, and a display system 140. Participants in the system 100 include at least one unmanned aerial vehicle (UAV) 150, an UAV controller 160, at least one manned aerial vehicle (MAV) 170, and a traffic information service (TIS) provider 180.

The navigation data source 110 could include any source(s) which provides navigation data information in an UAV 150. The navigation data source 110 could provide navigation data of the UAV 150 including, but not limited to, an identifier or identifying code identifying the UAV 150, its geographic position, altitude, direction of flight, and/or speed. UAV position may be comprised of geographic position (e.g., latitude and longitude coordinates) and altitude, and ground track may be derived from either geographic position, aircraft position, or both. In some embodiments, navigation data may be provided to the MG 120 and/or the IG 130 via a datalink.

The MG 120 and/or the IG 130 could include any electronic data processing unit which executes software or computer instruction code that could be stored, permanently or temporarily, in a digital memory storage device or a non-transitory computer-readable media (generally, memory 122 and memory 132) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The MG 120 and/or the IG 130 may be driven by the execution of software or computer instruction code containing algorithms developed for the specific functions embodied herein. The MG 120 and/or the IG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the MG 120 and/or the IG 130 could also include more than one electronic data processing unit. In some embodiments, the MG 120 and/or the IG 130 could be a processor(s) used by or in conjunction with any other system including, but not limited to, the display system 140.

In some embodiments, the terms "programmed" and "configured" are synonymous. The MG 120 and/or the IG 130 be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a datalink, a bus, through a wireless network, or as a signal received and/or transmitted by the MG 120 and/or the IG 130 via a physical or a virtual computer port. The MG 120 and/or the IG 130 may be programmed or configured to execute the methods discussed in detail below. The MG 120 may be programmed or configured to receive navigation data via a datalink and generate message data representative of aerial traffic information that is provided to various systems and/or units via a datalink including, but not limited to, the IG 130 and/or the TIS provider 180.

In some embodiments, the MG 120 may be integrated with the display system 140 and/or the UAV controller 160. In some embodiments, the MG 120 may be isolated from the display system 140 and/or any controller UAV 160. In some embodiments, the MG 120 may serve as a centralized hub configured to receive navigation data from a plurality of UAVs 150 and, in response, generate message data that is provided to and/or received by the 170 MAV and/or TIS provider 180.

In some embodiments, the IG 130 may be programmed or configured to generate image data representative of aerial traffic information in response to receiving message data generated and provided by the TIS provider 180. In some embodiments, the IG 130 may provide the image data to various systems and/or units including, but not limited to, the display system 140.

The display system 140 could include one or more display units configured to present aerial traffic information visually to the pilot. The display unit could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (PED) (e.g., laptops, smartphones, tablets, handheld control consoles, and/or user-wearable devices such as wrist- and head-mounted devices). The display system 140 may be configured to present one or more display(s) or image(s). In some embodiments, the terms "display" and "image" are interchangeable and treated synonymously.

The UAV 150 could mean any vehicle which is able to fly through the air or atmosphere remotely flown or operated in response to flight control commands generated by and received from the UAV controller 160. In some embodiments, the UAV 150 may include other aerial vehicles such as, but not limited to, an autonomous aircraft and/or an optionally-manned aircraft. The UAV 150 includes vehicles such as, but not limited to, civilian and military drones; lighter than air vehicles; and heavier than air fixed-wing and rotary-wing vehicles. In some embodiments, the UAV 150 may include the navigation data source 110 from which navigation data may be acquired by the MG 120 via a datalink.

The UAV controller 160 could include any fixed or portable device configured to generate and provide flight control commands to the UAV 150 via a datalink. The flight control commands may be generated in response to an operator's or pilot's manipulating of flight controls which remotely operates or flies the UAV 150. In some embodiments, the UAV controller 160 could be a single device integrated with the MG 120, the IG 130, the display system 140, or any combination of these.

The MAV 170 could mean any vehicle which is able to fly through the air or atmosphere flown or operated by pilot located inside the MAV 170 and includes vehicles such as, but not limited to, lighter than air vehicles and heavier than air fixed-wing and rotary-wing vehicles. In some embodiments, the MAV 170 may include an automatic dependent surveillance—broadcast (ADS-B) system. Known to those skilled in the art, the ADS-B system includes two services: ADS-B Out and ADS-B In.

ADS-B Out broadcasts information about the aircraft such as identification, current position, altitude, and velocity about an aircraft through an onboard transmitter to a ground receiver. The information broadcast in the ADS-B system may be represented in message data formatted in accordance with standards published by RTCA, Inc. in RTCA/DO-242A and DO-242A Change 1, both entitled "Minimum Aviation System Performance Standards for Automatic Dependent Surveillance Broadcast (ADS-B)," publications which are incorporated by reference herein in their entirety.

ADS-B Out provides air traffic control (ATC) with real-time position information that is, in most cases, more accurate than the information available with radar-based systems. Armed with this information, ATC is able to position and separate aircraft with improved precision and timing. In some embodiments, the MAV 170 may broadcast ADS-B Out message data to another MAV 170 and/or the TIS provider 180.

ADS-B In refers to an appropriately equipped aircraft's ability to receive and display another aircraft's ADS-B Out information as well as the ADS-B In services provided by ground systems known to those skilled in the art that include traffic information service—broadcast (TIS-B). When displayed in the cockpit, traffic and other information received by ADS-B In may greatly improve the pilot's situationally awareness in aircraft not equipped with a traffic collision avoidance system (TCAS) or airborne surveillance avoidance system (ACAS), other traffic surveillance systems known to those skilled in the art. In some embodiments, the MAV 170 may receive ADS-B In message data from another MAV 170, the TIS provider 180, and/or the MG 120.

The TIS provider 180 could include any source that may provide traffic surveillance information such as position, velocity, and status information of air and ground vehicles using information obtained from ADS-B, primary surveillance radar (which requires no reply from an aircraft), secondary surveillance radar (which requires aircraft to reply to interrogations), and other systems. In the United States, ATC is a common TIS provider 180. The information provided in the TIS-B system may be represented in message data formatted in accordance with standards published by RTCA, Inc. in RTCA/DO-286B entitled "Minimum Aviation System Performance Standards for Traffic Information Service Broadcast (TIS-B)," a publication which is incorporated by reference herein in its entirety. In some embodiments, the TIS provider 180 may receive message data from the MG 120 and/or the MAV 170 and, in response, generate TIS-B message data provided to and/or acquired by the IM 130 and the MAV 170.

Figure 2:
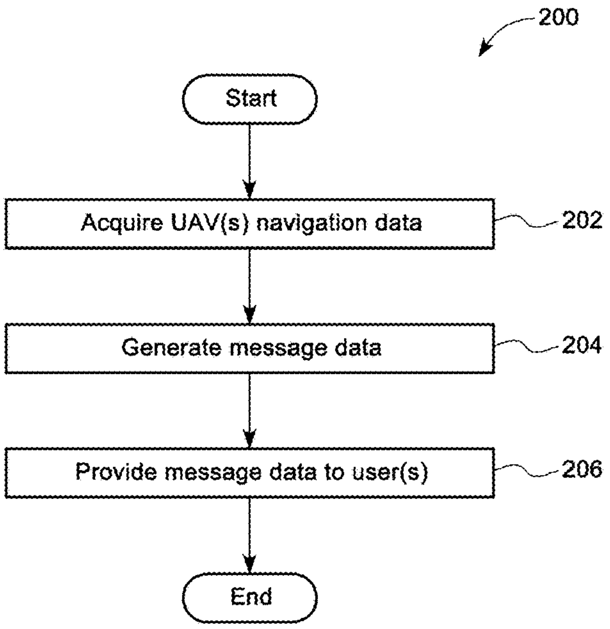
FIG. 2 depicts a flowchart illustrating an exemplary embodiment of a method for generating and providing message data representative of a plurality of AVs not configured with ADS-B system equipment.
Figure 3:
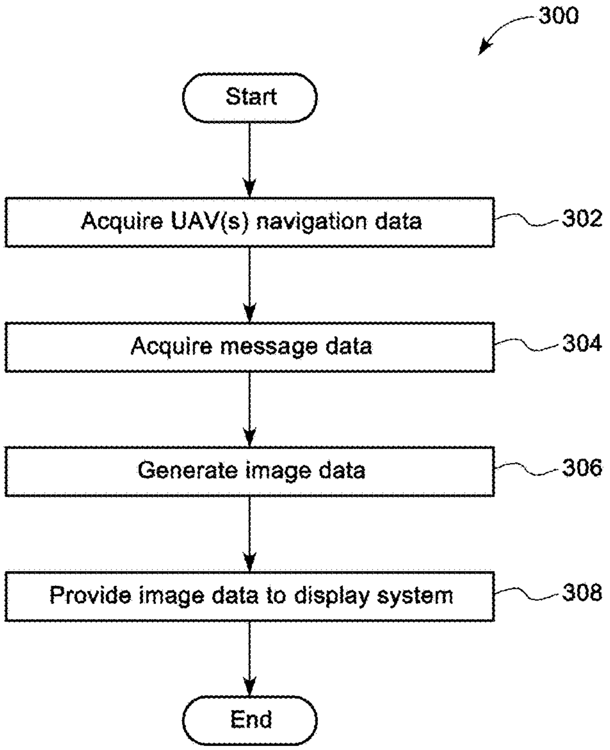
FIG. 3 depicts a flowchart illustrating an exemplary embodiment of a method for generating image data and presenting an image of AV positions represented in the image data.

Some advantages and benefits of the inventive concepts disclosed herein are shown in the flowcharts of FIGS. 2 and 3, illustrating how minimal navigation information provided by a plurality of AVs that are not equipped with ADS-B systems may be used to generate message data and image data. With the image data, situational awareness of an AV pilot or operator may be enhanced by visually conveying traffic information of the AVs represented in a message format(s) that is different from ADS-B format along with the traffic information represented in ADS-B format. Upon being viewed, the AV pilot or operator could "see and avoid" another AV(s) operating nearby or in close proximity.

FIG. 2 depicts flowchart 200 disclosing an example of a method for generating and providing message data employed in a stationary or mobile control station in conjunction with an AV, where the MG 120 may be programmed or configured with instructions corresponding to the modules embodied in flowchart 200. In some embodiments, the MG 120 may be a processor or a combination of processors found in the display system 140, the UAV controller 160, or any other system suitable for performing the task. Also, the MG 120 may be a processor of a module such as, but not limited to, a printed circuit card having one or more input interfaces to facilitate the two-way data communications of the MG 120, i.e., the receiving and providing of data. As necessary for the accomplishment of the following modules embodied in flowchart 200, the acquiring of data is synonymous and/or interchangeable with the receiving and/or retrieving of data, and the providing of data is synonymous and/or interchangeable with the making available or supplying of data.

The method of flowchart 200 begins with module 202 with the MG 120 acquiring navigation data, where the navigation data could be representative of a first message from one or more of the AVs which includes elements which identify the AV and at least its geographic position. The first message could be reported by one or more AVs in a data format that is different from and/or limited to data formats employed by both ADS-B and TIS-B systems. In some embodiments, a first element could include an altitude and/or height of the AV(s). In some embodiments, the navigation data could include state information of the AV(s). In some embodiments, the navigation data could include a speed and/or directional information. In some embodiments, the navigation data may be formatted in accordance with ADS-B Out standards.

The method of flowchart 200 continues with module 204 with the MG 120 generating message data based upon one or more first messages and representative of a second message which includes at least the following elements for each AV: identity, geographic position, speed, direction of travel, an altitude, and/or vertical speed. These elements may refer to the following state vector (SV) report elements defined in RTCA/DO-242A and DO-242A Change 1 at the time of this writing: identity may refer to the SV elements for ID, geographic position to the SV geometric position elements, speed to the SV horizontal velocity elements, direction of travel to the SV heading elements, altitude to the SV baro altitude elements, and vertical speed to the SV vertical rate elements. In some embodiments, the altitude could be set to a default value. For example, an UAV may have a maximum operating altitude (e.g., actual altitude, pressure altitude, density altitude) defined be a manufacture of the UAV to which it has been certified for operations, or the owner and/or operator configure the altitude as a default altitude, above which the UAV may not operate. In some embodiments, the speed and/or the directional information may be determined from, for example, changes in successive measurements of geographic position of the AV(s) over a short period of time. In some embodiments, the vertical speed may be determined from, for example, changes in successive measurements of altitude of the AV(s) over a short period of time.

In some embodiments, the message data may be formatted in accordance with ADS-B Out standards and include a third message which, when combined with the seconds elements, forms a message which complies with one or more of the reports stated in RTCA/DO-242A and DO-242A Change 1 at the time of this writing: state vector report, mode status report, air referenced velocity report, target state reports, and trajectory change reports.

The method of flowchart 200 continues with module 206 with the MG 120 providing the message data to one or more users which may include the other AVs (e.g., the MAV 170) and the TIS provider 180. In some embodiments, each user could be a participant participating in the ADS-B system and/or the TIS-B system.

Optionally, the MG 120 may provide the message data to the IG 130 configured to receive the navigation data. In some embodiments, the IG 130 may generate image data representative of an image depicting one or more AVs identified in the first elements and provide the image data to one or more display units configured to present to the image to one or more viewers, where the image may be presented two-dimensionally (e.g., a plan view) or three-dimensionally (e.g., egocentrically or exocentrically). In some embodiments, the IG 130 may be configured to perform module 306 that is disclosed below. In some embodiments, the image data is generated in an image data format from which the image may be presented on one or more PEDs. Then, the method of flowchart 200 ends.

FIG. 3 depicts flowchart 300 disclosing an example of a method for generating image data representative of an image of positions of AVs and presenting the image, where the IG 130 may be programmed or configured with instructions corresponding to the modules embodied in flowchart 300. In some embodiments, the IG 130 may be a processor or a combination of processors found in the display system 140 or any other system suitable for performing the task. Also, the IG 130 may be a processor of a module such as, but not limited to, a printed circuit card having one or more input interfaces to facilitate the two-way data communications of the IG 130, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the IG 130 acquiring navigation data representative of a first message in the same or similar fashion as performed by the MG 120 in module 202. The method of flowchart 300 continues with module 304 with the IG 130 acquiring message data representative of a second message from the TIS provider 180. The second message could include elements identifying one or more AVs identified by the first elements represented in the navigation data. Also, the second message could include elements identifying one or more second AVs. In addition, the second message could include elements specifying a location, a speed, a direction of travel, an altitude, and/or vertical speed for each second AV.

The method of flowchart 300 continues with module 306 with the IG 130 generating image data representative of an image as a function of one or more first messages and one or more second message and representative of one or more AVs identified by the first elements and one or more second AVs identified by the second elements, where the image may be presented two-dimensionally or three-dimensionally. In some embodiments, the image could include one or more AVs identified by the first elements and one or more second AVs. The function could exclude those second message(s) identifying the one or more first AVs identified by the second elements, where this exclusion could avoid the presentation of two images of each AV identified by both the first elements and the second.

The method of flowchart 300 continues with module 308 with the IG 130 providing the image data to at least one display system 140, where the image represented in the image data could be presented on one or more display units a viewer(s). Then, the method of flowchart 300 ends.

It should be noted that the steps of method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Furthermore, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A device for reporting aerial traffic, comprising:

an aerial vehicle (AV) controller comprised of at least one processor coupled to a non-transitory processor-readable medium storing processor-executable code and configured to:

generate and provide flight control commands to an AV being commanded;

receive navigation data representative of a plurality of first messages from a plurality of first aerial vehicles (AVs), where the plurality of first AVs includes the AV being commanded, and each of the plurality of first messages is received from one first AV of the plurality of first AVs and comprised of first elements identifying the one first AV, and specifying at least geographic position of the one first AV in a format different from formats specified in an automatic dependent surveillance-broadcast (ADS-B) system and a traffic information service-broadcast (TIS-B) system;

generate message data representative of at least one second message in response to receiving the navigation data and comprised of second elements identifying at least one first AV of the plurality of first AVs, and specifying at least the geographic position, a speed, a direction of travel, and an altitude of the at least one first AV; and provide the at least one second message represented in the message data to at least one second AV different from each first AV of the plurality of first AVs, such that the at least one second message is provided to at least one user.

2. The device of claim 1, wherein the first elements further specify altitude of the one first AV.

3. The device of claim 1, wherein the speed and the direction of travel of the at least one first AV are determined from a plurality of the specified geographic positions of the at least one first AV.

4. The device of claim 1, wherein
the message data is generated in a format employed by at least one of
the ADS-B system, and
the TIS-B system, where
each second message of the at least one second message includes third elements, such that
the second elements combined with the third elements comply with elements required in at least one of
the ADS-B system, and
the TIS-B system.

5. The device of claim 1, wherein
the AV controller is further configured to:
provide the navigation data to an image generator configured to:
receive the navigation data; and
generate image data representative of an image presentable to at least one viewer depicting at least one first AV identified by the first elements.

6. The device of claim 5, wherein the image data is generated in a data format employed by a portable electronic device.

7. The device of claim 1, further comprising:
an image generator configured to:
receive the navigation data;
receive message data representative of at least one third message from a traffic information service (TIS) provider comprised of elements required in a TIS-B system for
identifying at least one first AV identified by the second elements,
identifying at least one third AV different from the at least one first AV identified by the second elements, and
specifying at least a geographic position, a speed, a direction of travel, and an altitude for each one of the third AV;
generate image data as a function of at least one first message and at least one third message and representative of an image depicting
at least one first AV identified by the first elements, and
at least one third AV different from the at least one first AV identified by the third elements, where
the function excludes each one of the at least one third messages identifying at least one first AV identified by the second elements; and
provide the image data to a display system, whereby the image is presentable to at least one viewer.

8. The device of claim 7, wherein the image data is generated in a data format employed by a portable electronic device.

9. A method for reporting aerial traffic performed by an aerial vehicle (AV) controller comprised of at least one processor coupled to a non-transitory processor-readable medium storing processor-executable code, comprising:
generating and providing flight control commands to an AV being commanded;
receiving navigation data representative of a plurality of first messages from a plurality of first aerial vehicles (AVs), where
the plurality of first AVs includes the AV being commanded, and
each of the plurality of first messages is received from one first AV of the plurality of first AVs and comprised of first elements
identifying the one first AV, and
specifying at least a geographic position of the one first AV in a format different from formats specified in an automatic dependent surveillance-broadcast (ADS-B) system and a traffic information service-broadcast (TIS-B) system;
generating message data representative of at least one second message in response to receiving the navigation data and comprised of second elements
identifying at least one first AV of the plurality of first AVs, and
specifying at least the geographic position, a speed, a direction of travel, and an altitude of the at least one first AV; and
providing the at least one second message represented in the message data to at least one second AV different from each first AV of the plurality of first AVs, such that the at least one second message is provided to at least one user.

10. The method of claim 9, wherein the first elements further specify of the one first AV.

11. The method of claim 9, wherein the speed and the direction of travel of the at least one first AV are determined from a plurality of the specified geographic positions of the at least one first AV.

12. The method of claim 9, wherein
the message data is generated in a format employed by at least one of
the ADS-B system, and
the TIS-B system, where
each second message of the at least one second message includes third elements, such that
the second elements combined with the third elements comply with elements required in at least one of
the ADS-B system, and
the TIS-B system.

13. The method of claim 9, further comprising:
providing the navigation data to an image generator configured for:
receiving the navigation data; and
generating image data representative of an image presentable to at least one viewer depicting at least one first AV identified by the first elements.

14. The method of claim 13, wherein the image data is generated in a data format employed by a portable electronic device.

15. The method of claim 9, further comprising:
an image generator configured for:
receiving the navigation data;
receiving message data representative of at least one third message from a traffic information service (TIS) provider comprised of elements required in a TIS-B system that includes
identifying at least one first AV identified by the second elements,
identifying at least one third AV different from the at least one first AV identified by the second elements, and
specifying at least a geographic position, a speed, a direction of travel, and an altitude for each one of the third AV;
generating image data as a function of at least one first message and at least one third message and representative of an image depicting
at least one first AV identified by the first elements, and at least one third AV different from the at least one first AV identified by the third elements, where the function excludes each one of the at least one third messages identifying at least one first AV identified by the second elements; and providing the image data to a display system, whereby the image is presentable to at least one viewer.

16. The method of claim 15, wherein the image data is generated in a data format employed by a portable electronic device.

17. A method for presenting aerial traffic information performed by an aerial vehicle (AV) controller comprised of at least one processor coupled to a non-transitory processor-readable medium storing processor-executable code, comprising:

generating and providing flight control commands to an AV being commanded;

receiving navigation data representative of a plurality of first messages from a plurality of first aerial vehicles (AVs), where the plurality of first AVs includes the AV being commanded, and each of the plurality of first messages is received from one first AV of the plurality of first AVs and comprised of first elements identifying the one first AV, and specifying at least a geographic position of the one first AV in a format different from formats specified in an automatic dependent surveillance-broadcast (ADS-B) system and a traffic information service-broadcast (TIS-B) system;

receiving message data representative of at least one second message from a traffic information service (TIS) provider comprised of elements required in a TIS-B system that include identifying at least one first AV identified by first elements, identifying at least one second AV different from the at least one first AV identified by the second elements, and specifying at least a geographic position, a speed, a direction of travel, and an altitude for each one of the second AV;

generating image data as a function of at least one first message and at least one second message and representative of an image depicting at least one first AV identified by the first elements, and at least one second AV different from the at least one first AV identified by the second elements, where the function excludes each one of the at least one second messages identifying at least one first AV identified by the second elements; and providing the image data to a display system, such that the image represented in the image data is presentable to at least one viewer.

18. The method of claim 17, wherein the first elements further specify altitude of the one first AV.

19. The method of claim 17, wherein the speed and the direction of travel of the at least one first AV are determined from a plurality of the specified geographic positions of the at least one first AV.

20. The method of claim 17, wherein the image data is generated in a data format employed by a portable electronic device.

* * * * *